United States Patent [19]

Diepold-Scharnitzky et al.

[11] Patent Number: 4,497,038
[45] Date of Patent: Jan. 29, 1985

[54] ELECTRONIC CONTROLLER HAVING A DETACHABLE FRONT PANEL

[75] Inventors: Rudolf Diepold-Scharnitzky; Wolfgang Lesche; Volker Rindfleisch, all of Berlin, Fed. Rep. of Germany

[73] Assignee: Siemens Aktiengesellschaft, Berlin and Munich, Fed. Rep. of Germany

[21] Appl. No.: 383,102

[22] Filed: May 28, 1982

[30] Foreign Application Priority Data

May 29, 1981 [DE] Fed. Rep. of Germany ....... 3122037

[51] Int. Cl.³ ............................................. G06F 15/46
[52] U.S. Cl. .................................................... 364/900
[58] Field of Search ............... 364/900, 200, 130, 131, 364/132, 133, 134, 135, 136, 137, 138, 139, 140, 146, 188, 189, 171; 361/393

[56] References Cited

U.S. PATENT DOCUMENTS

| | | | |
|---|---|---|---|
| 3,942,077 | 3/1976 | Powers | 361/393 |
| 4,064,394 | 12/1977 | Allen | 364/189 |
| 4,074,350 | 2/1978 | Roch et al. | 364/188 |
| 4,228,495 | 10/1980 | Bernhard et al. | 364/171 |
| 4,263,647 | 4/1981 | Merrell et al. | 364/136 |
| 4,380,796 | 4/1983 | Ostby | 364/188 |
| 4,424,559 | 1/1984 | Lovincz et al. | 364/188 |

OTHER PUBLICATIONS

Microprocessor Controller for Process Heating Applications—Instruction Manual—vol. 1—Barber Colman Co., Sep. 1979, pp. 1-26.

Primary Examiner—Gareth D. Shaw
Assistant Examiner—Jameson Lee
Attorney, Agent, or Firm—Kenyon & Kenyon

[57] ABSTRACT

An electronic controller having a detachably mounted front panel unit on which display devices and control elements are arranged is disclosed. By means of the control elements, the process variables and the control parameters are changed incrementally. Values of the control parameter, process variables, and the selected control parameter are indicated by the display devices. To provide a compact, independent front panel unit which can be removed from the main housing of the controller for protection against unauthorized operation, the front panel unit is provided with a slave microprocessor which is connected via a plug-in connector to a master microprocessor in the main housing. Because the master microprocessor operates independently of the front panel mounted slave microprocessor, the front panel unit can be removed without affecting the operation of the controller.

4 Claims, 6 Drawing Figures

ELECTRONIC CONTROLLER HAVING A DETACHABLE FRONT PANEL

BACKGROUND OF THE INVENTION

1. Field of the Invention

The present invention relates to an electronic controller having a front panel unit at which control elements are arranged which allow selection and incremental changes of controller process variables, stepwise selection of control parameters in the electronic controller and incremental changes of the values of the control parameters, and which has indicating devices by which the prevailing values of the process variables, the then selected control parameter and the value of the respectively selected control parameter can be indicated.

2. Description of the Prior Art

In a known electronic controller of this type (Equipment description "Microprocessor Control for Process Heating Applications", pages 1 to 19, Barber Colman Company, USA, Sept. 1979) it is possible to incrementally vary the process variables of a controller, for instance, the desired variable, and also the values of the control parameters, for instance, control gain and time constants, by means of control elements on a front panel unit. An indicating device with light-emitting diodes (LEDs) is suitable for the decimal display of the values of the control variables or the control parameters and another indicating device, such as a linear array of LED elements can identify the selected control parameter. The front panel unit of this known controller with its circuit parts is a fixed component of the overall system, so that the front panel unit and the controller housing form one unit. Changes in the values of the control parameters can be made at the front panel unit at any time, but improper use by unauthorized persons is not precluded.

SUMMARY OF THE INVENTION

It is an object of the present invention to provide an electronic controller in which protection from improper operation by unauthorized persons is achieved while at the same time maintaining the operability of the controller at comparatively low cost.

To solve this problem, according to the invention, the front panel unit is mounted detachably to the electronic controller of the type above described by means of a plug-in connection at the housing of the electronic controller. The front panel unit includes a slave microprocessor module which is hard wired to the control elements and the display devices. The slave microprocessor is connected via the plug-in connections between the front panel unit and the housing to a master microprocessor module in the housing of the electronic controller.

The slave microprocessor module attached to the front panel unit controls the display devices in such a manner that they display the values of the process variables or the selected control parameter analog or digitally. In addition, the signals generated by the control elements for incrementally changing the values of the process variables or the control parameters are converted by the slave microprocessor module into suitable digital signals and are made available via the plug-in connection to the master microprocessor and associated circuits in the controller main housing.

The electronic controller according to the invention is advantageous because it creates a compact front-panel unit which can be detached from the housing of the electronic controller without influencing the operation of the electronic controller during the controlled process. All functions relating to the controlled process proper in the electronic controller are executed by the master microprocessor module in the main housing. All functions assigned to the front panel unit are executed by the slave microprocessor module and thus two independent operating modules having different functions are provided.

By providing the compact independent front panel unit, which can be plugged into the respective main housing of an electronic controller, it is possible to operate several electronic controllers with only a single front panel unit. Thus, the front panel unit may be plugged into the housing of one controller, but is still available to another electronic controller if, for example, the operating personnel wants to change control parameters, or monitor the process variables, by simply unplugging the front panel unit from the first controller, and plugging into the second. Thus, considerable savings of equipment results, especially if several controllers operate simultaneously, and the electronic controllers are secured against parameter changes by unauthorized persons when the front panel unit is unplugged.

It is further possible to combine the front panel unit with a printing mechanism for printing out the values of the process variables or the control parameters, and with a data carrier, for instance, a tape memory, for entering predetermined parameter values. Additionally, extensive service measures can be carried out simply with only a single front panel unit.

It is particularly advantageous to connect the master microprocessor module to a non-volatile memory into which data from the master microprocessor is read. The stored contents in the memory are thereby preserved in the event of a power failure. In this embodiment it is assured that the settings of the control parameters are preserved in the event of unintended power failures, and thus a new input of values is unnecessary when operation is resumed.

It is also particularly advantageous that the master microprocessor and all other components necessary for controlling the process variables are arranged in the main housing of the electronic controller, and that the only plug-in contacts that are necessary are for establishing a power supply for the front panel unit and serial data exchange between the slave and master microprocessor modules. Because the data exchange between the two microprocessor modules takes place in the form of serial digital pulses, only a few connecting lines are required for the exchange of data and for the transmission of clock pulses and power.

Thus, due to the relatively small number of necessary plug-in contacts, an electrical connection between the front panel unit and the circuit elements in the main housing can be made in a particularly simple manner without expensive mechanical components.

A particularly simple and easily readable display of the process variables and the control parameters is obtained if rows of adjacent light emitting indicating elements are provided as the display devices. One row may serve to identify the selected control parameter, and other rows of indicator elements indicate the value of the respectively selected control parameter and the values of the process variables. It is also possible to limit the number of indicating devices and control elements by providing double-throw switching means so that an indicating device and a pair of control elements can be utilized either for indicating or changing a process variable or for indicating or changing a control parameter.

These individual display elements, which require separate control lines, are addressed in a simple manner by appropriate control outputs of the slave microprocessor module wherein the number of the respectively addressed indicator elements corresponds to the respective value of the control parameter or the process variable. The indicating elements may be light-emitting diodes or fluorescent elements.

These and other novel features and advantages of the invention will be described in greater detail in the following detailed description.

DETAILED DESCRIPTION

Figure 1:
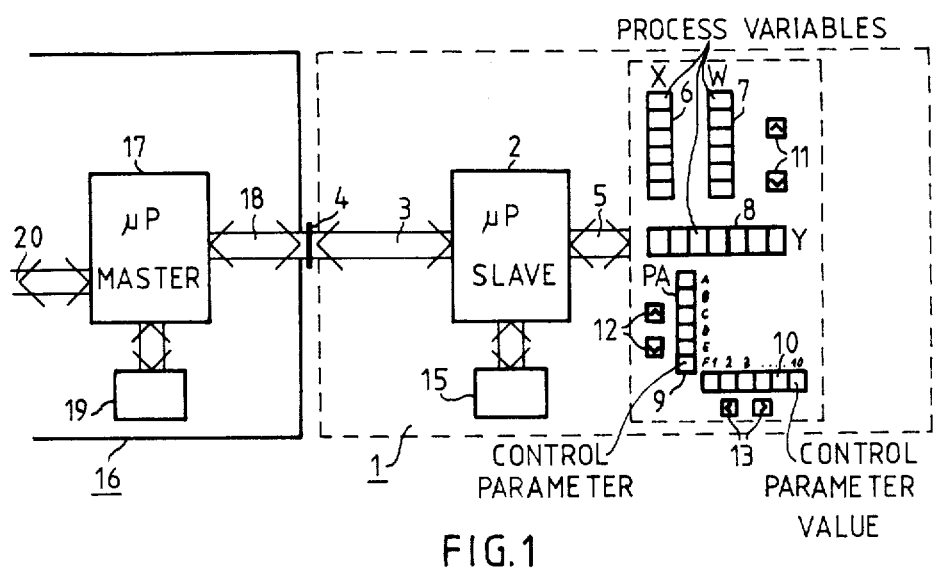
FIG. 1 is a block diagram of an embodiment of the controller with the front panel unit according to the invention and showing part of the circuit arrangement in the main housing of the controller.

With reference to the drawings, and particularly FIG. 1, the front panel unit 1, shown by broken lines, contains a slave microprocessor module 2 which is connected via connecting lines 3 to the plug-in contacts of a connector 4 at the rear of the front panel unit 1. Via conventional bus lines 5, the slave microprocessor module 2 is coupled to the display elements of the display devices 6 to 10 as well as to control elements 11, 12 and 13 which are arranged on the front of the front panel unit 1. A memory 15 is coupled to the slave microprocessor 2, in which the input and output data of the slave microprocessor 2 are stored. The main housing 16 of the electronic controller, which is indicated by a solid line, contains master microprocessor module 17 which is connected via connecting lines 18 to the corresponding mating contacts of the connector 4. A nonvolatile memory module 19 stores data from the master microprocessor 17 and preserves this data in the event of a power failure.

Via input and output channels 20, master microprocessor 17 is addressed by field signals which are derived from the process to be controlled, for instance, a temperature control. In order to provide an indication of the process variables, the master microprocessor 17 makes serial data available via the connecting lines 18, the plug-in connections 4 and the connecting lines 3, to the slave microprocessor 2. Slave microprocessor 2 converts the serial data into corresponding control signals for the display devices 6 to 10. In the embodiment shown, the display devices 6, 7, 8 and 10 comprise linear arrays of light-emitting diodes which, if addressed properly, form a continuous light column which is equivalent to the value of the variable to be displayed. The display device 9 identifies the respectively selected control parameter. It is only necessary to address one display element to identify the selected control parameter in the adjacent display panel, for example, the parameters A through F, as shown in FIG. 1.

If the value of a process variable is to be changed, for instance, the control input W at the display device 7, it is accomplished by operating the corresponding control elements 11, whereby an incremental change of the value is accomplished. Similar control elements are provided for display devices 6 and 8, but are not shown in FIG. 1. A change of the value of one of the control parameters is accomplished by means of the control elements 13. A change in the selection of a control parameter is carried out by means of the control elements 12. The control elements are connected via parallel control lines of the bus 5 to the slave microprocessor 2, which converts the control signals of the control elements into corresponding serial signals. These serial signals are made available via the connecting lines 3, the plug-in connector 4 and the connecting line 18 to the master microprocessor 17. Thus, a change of control parameters or process variables can be made at the front panel unit. The master microprocessor 17 in the main housing 16 of the controller is arranged so that it is able to maintain all control functions if the front panel unit 1 is removed. When the front panel unit is removed, however, unauthorized changing of the control parameters is largely prevented.

Figure 1A:
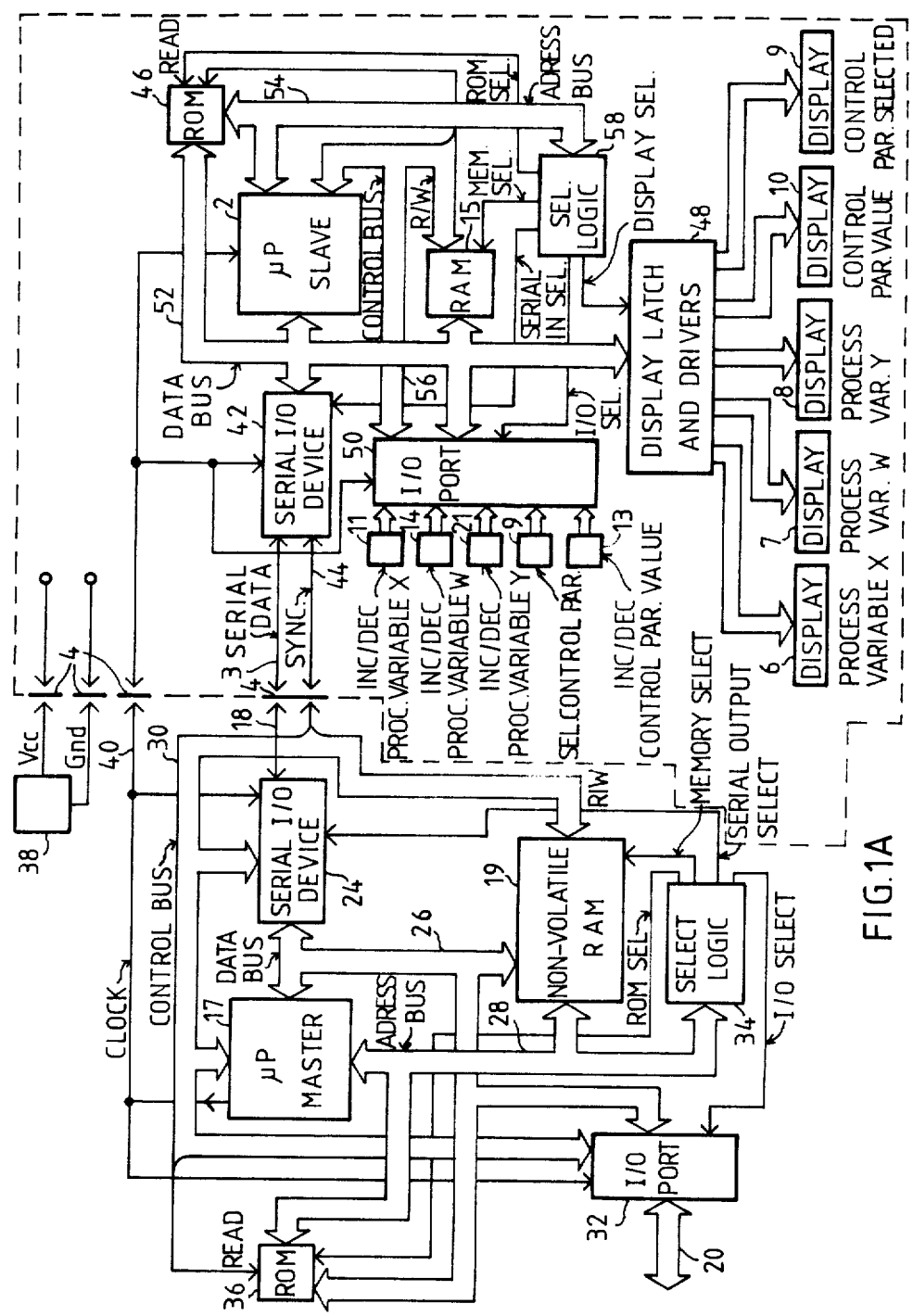
FIG. 1A is a detailed block diagram of the electrical interconnections between the main blocks in the controller.

FIG. 1A illustrates in more detail the electrical interconnections between the blocks shown in FIG. 1. As shown, the master microprocessor 17 is connected to the other parts of the system via conventional data bus 26, address bus 28 and control bus 30. Parallel data on the data bus 26 is converted to serial form by the serial input/output (I/O) device 24, and then coupled by line 18 and connector 4 to the front panel unit 1. Process control data is coupled to the controller via I/O bus 20 and I/O port 32. Select logic 34 addressed by the microprocessor 17 determines which device is being selected by the microprocessor, thus allowing data from the various blocks to be transferred via the data bus 26 at the proper times. Program control is contained in ROM 36. A power supply 38 is shown coupled via the connector 4 to the front panel unit to provide power thereto. Additionally, clock pulses on line 40 are transferred via connector 4 to the front panel unit, and control data from the control bus 30 provides proper synchronizing information for the serial data exchange at the front panel unit. Control bus 30 includes other conventional controlling lines, such as memory read and write commands and various interrupts for stopping the operation of the controller.

The front panel unit 1 includes serial I/O device 42, for reconverting the serial data to parallel form. The synchronizing information on line 44 allows proper reconversion to parallel form.

Slave microprocessor 2 is connected to memory 15, program control ROM 46, the serial I/O device 42, display latch and drivers 48, the various displays 6 to 10 for the process variable and selected control parameter and value, and I/O port 50, via conventional data bus 52, address bus 54 and control bus 56. Select logic 58 allows proper selection of the various devices on the busses. Display devices 6, 7, 8 and 10 are, according to the preferred embodiment, linear arrays of LED's which represent a value of the respective variable or parameter in bar-graph fashion, i.e., according to the number of continuous LED elements which are lit. Other devices, could be used, for example, seven segment LED a fluorescent displays. Display device 9 is another linear array, but only one of the LED's contained therein need be lit at one time to indicate the selected control parameter.

Control parameters and process variables are selected and changed via the appropriate control elements 9, 11, 13, 14 and 21, which are up/down counters operated by switches connected to the appropriate up or down inputs of the counters. I/O port 50 places data from the appropriate control elements on the data bus 52 after generating an interrupt on control bus 56.

Figure 1B:
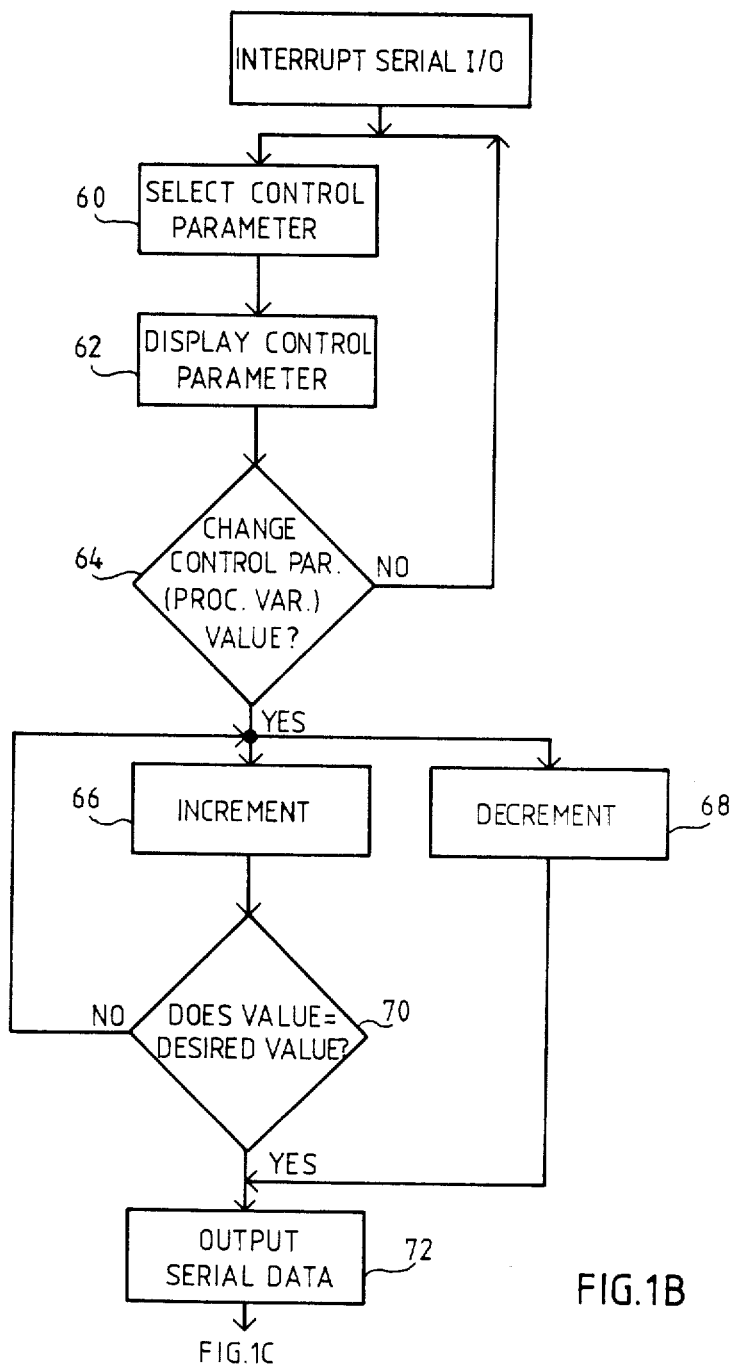
FIG. 1B is a flow chart of the control program stored in the ROM coupled to the slave microprocessor.

FIG. 1B is a flow chart of the relevant part of the program stored in ROM 46 of the front panel unit and is conventional to those skilled in the art of digital computer programming. As illustrated in the flow chart, when an interrupt is received by microprocessor 2, a new control parameter can be selected by control element 9 as shown by 60 in FIG. 1B. The new value of the control parameter is then displayed as shown at 62.

If a process variable or control parameter value is to be changed once a particular control parameter or process variable has been selected, as shown by the decision block 64, control elements 11, 13, 14 or 21 are incremented or decremented as shown at 66 or 68. Once the desired value is obtained, as shown by block 70, the loop is exited and the data is then outputted to serial I/O device 42 for updating the controlled process as shown at 72. The program of FIG. 1C is then implemented by master microprocessor 17.

Figure 1C:
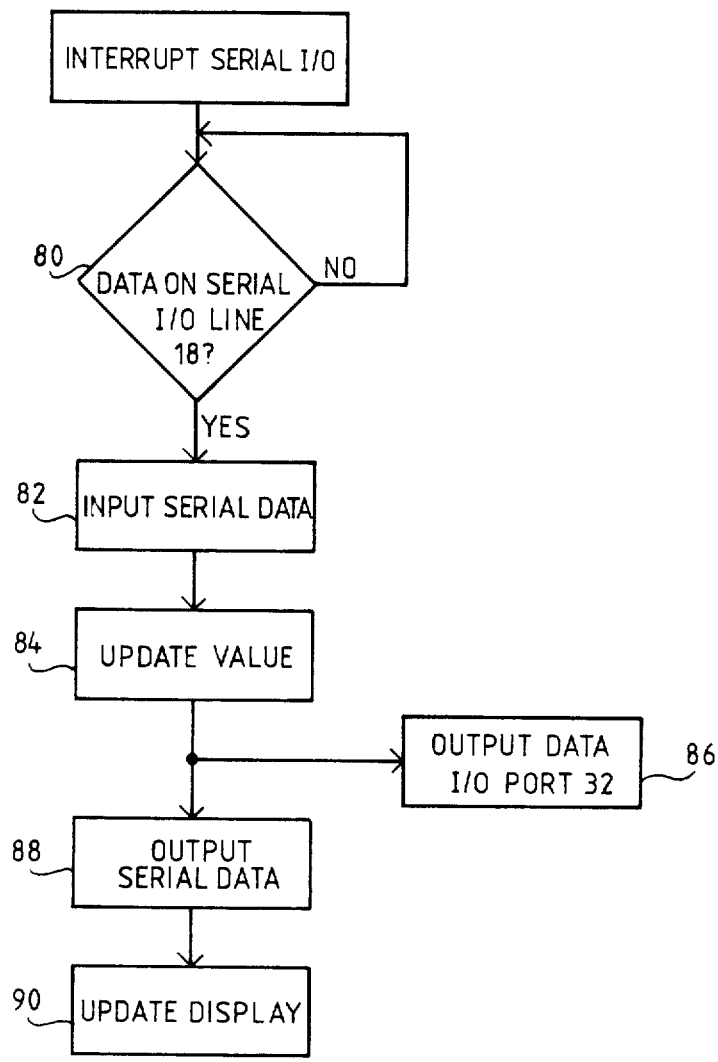
FIG. 1C is a flow chart of the control program stored in the ROM coupled to the master microprocessor.

FIG. 1C is a flow chart of part of the control program stored in ROM 36 and implemented by master microprocessor 17. The program stored in ROM 36 is conventional to those skilled in the art of digital computer programming. As shown in FIG. 1C, when a control parameter or process variable is to be changed, an interrupt is received and slave microprocessor 2 will output data to serial I/O device 42. Master microprocessor 17 will check whether serial data is being received on line 18 by serial I/O device 24 as shown at 80. If serial data is being received, appropriate control lines in control bus 30 will enable serial I/O device 24 to input the serial data and transmit the data to master microprocessor 17 as shown at 82. Microprocessor 17 updates the value of the control parameter or process variable for process control as shown at 84 and outputs the new value via I/O port 32 as shown at 86. The new value is then retransmitted back to slave microprocessor 2 via serial I/O devices 24, connector 4 and serial I/O device 42 for updating the front panel display as shown by blocks 88 and 90.

Figure 2:
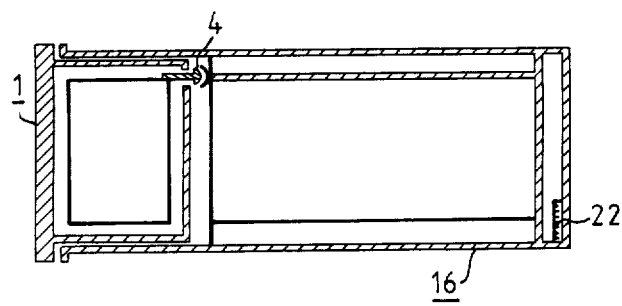
FIG. 2 is the mechanical design of the controller with the front panel unit assembled to the main controller housing.

In FIG. 2 a cross section through the mechanical design of the main housing 16 and the front panel unit 1 of the controller is shown. In FIG. 2 the front panel unit 1 is shown disposed in the main housing 16 of the electronic controller and the circuit portions of the front panel unit 1 are connected via the connector 4 to the other circuit parts of the controller in the main housing 16. Via a further connector 22 at the rear of the main housing 16, the field signals required for process control are fed to I/O port 32 of the controller.

Figure 3:
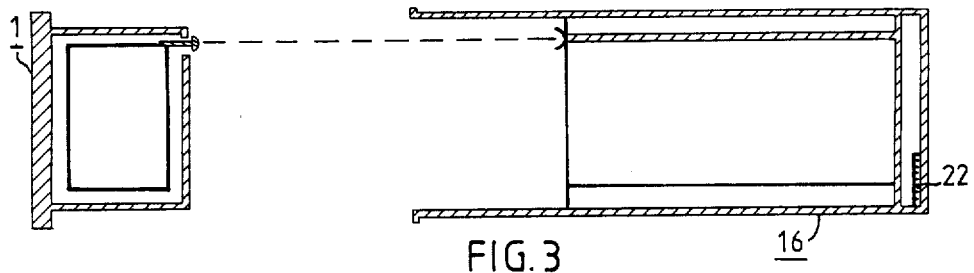
FIG. 3 shows the front panel detached from the main housing.

FIG. 3 shows a cross section through the mechanical design of the controller with the front panel unit 1 detached. After the front panel unit 1 is removed, the front opening of the housing 16 can be closed off, for example, by a dummy panel, and can thereby be protected, for instance, from moisture. However, it is possible to insert additional circuit boards into the housing through the opening in the front of the main housing. With these additional circuit boards, certain predetermined values of the process variables can be entered for servicing purposes without bringing about a permanent change of the electronic controller.

In the foregoing specification, the invention has been described with reference to a specific exemplary embodiment thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. In an electronic controller for controlling an external process, the controller being of the type having a main housing for control circuitry for controlling at least one of a plurality of process variables and at least one of a plurality of control parameters associated with the process, a front panel unit on which are arranged means for incrementally changing a value of at least one process variable controlled by the controller in discrete magnitude steps, means for selecting a control parameter controlled by the electronic controller, means for incrementally changing a value of the selected control parameter in discrete magnitude steps, means for indicating the value of the process variable, means for indicating the selected control parameter and means for indicating the value of the selected control parameter, the improvement comprising:

means for electrically detachably connecting the front panel unit from said main housing of the electronic controller;

means for mechanically detachably connecting the front panel unit from said main housing of the electronic controller;

a master microprocessor included in said control circuitry contained in said main housing for controlling the process, said master microprocessor receiving inputs associated with said at least one process variable and said control parameters from said controlled process and transmitting outputs associated with said at least one process variable and said control parameters to said controlled process; and a slave microprocessor contained in said front panel unit and permanently electrically coupled to said means for selecting a control parameter, said means for incrementally changing a value of the selected control parameter, said means for incrementally changing a value of the at least one process variable, said means for indicating the selected control parameter, said means for indicating the value of the at least one process variable and said means for indicating the value of the selected control parameter, said slave microprocessor coupled to said master microprocessor in said main housing through said means for electrically detachably connecting and said means for mechanically detachably connecting, said slave microprocessor being responsive to signals received from said master microprocessor via said means for electrically detachably connecting for updating values of said at least one process variable and said control parameters and transmitting signals to said master microprocessor via said means for electrically detachably connecting for changing the value of said selected control parameter and said at least one process variable in response to actuation of said respective means for incrementally changing the value of said selected control parameter and said at least one process variable;

said control circuitry in said main housing comprising means for independently controlling the process whereby said front panel unit may be detached from said main housing without interrupting the control of the process.

2. The improvement according to claim 1 and further comprising:

a non-volatile memory included in said control circuitry disposed in said main housing and coupled to said master microprocessor into which data from said master microprocessor associated with the values of said at least one process variable and said control parameters may be stored and preserved in the event of a power failure.

3. The improvement according to claim 1 wherein said means for electrically detachably connecting includes means for connecting a power supply coupled to said control circuitry to said front panel and means for serially exchanging data between said slave and master microprocessor.

4. The improvement according to claim 1, 2 or 3 wherein said means for indicating the selected control parameter comprises a linear array of adjacently arranged light emitting indicating elements, each one of said elements identifying a particular one of said control parameters and said means for indicating the value of the process variable and said means for indicating the value of the selected control parameter each comprises a linear array of adjacently arranged light emitting indicating elements.

* * * * *